United States Patent [19]

Meister

[11] 4,071,457
[45] Jan. 31, 1978

[54] OIL RECOVERY PROCESS USING VISCOSIFIED SURFACTANT

[75] Inventor: John J. Meister, Bartlesville, Okla.

[73] Assignee: Phillips Petroleum Company, Bartlesville, Okla.

[21] Appl. No.: 728,377

[22] Filed: Sept. 30, 1976

Related U.S. Application Data

[62] Division of Ser. No. 654,435, Feb. 2, 1976, Pat. No. 4,007,792.

[51] Int. Cl.$^2$ .................. E21B 43/22; E21B 43/26; C09K 7/02
[52] U.S. Cl. .................. 252/8.55 D; 166/274; 166/275; 252/8.5 A; 252/8.5 C; 252/8.55 R; 252/8.55 C
[58] Field of Search ............... 252/8.55 D, 8.55 R; 166/274, 275

[56] References Cited

U.S. PATENT DOCUMENTS

| | | | |
|---|---|---|---|
| 3,361,313 | 1/1968 | Riggs et al. | 252/8.55 |
| 3,504,744 | 4/1970 | Davis et al. | 166/275 |
| 3,508,612 | 4/1970 | Reisberg et al. | 166/275 X |
| 3,587,737 | 6/1971 | Tosch | 166/275 X |

*Primary Examiner*—Herbert B. Guynn

[57] ABSTRACT

Thixotropic compositions having initially relatively high viscosity which can decrease with time are prepared by admixing water and chloroform with an anionic surfactant, a cationic surfactant, an acid to adjust the pH of the aqueous phase to 4.5 or less, and a buffer salt. These compositions are valuable drilling fluids, fracturing fluids, and surfactant fluids for chemical flooding in tertiary oil recovery.

2 Claims, No Drawings

OIL RECOVERY PROCESS USING VISCOSIFIED SURFACTANT

This is a divisional application of my copending patent application, Ser. No. 654,435 filed Feb. 2, 1976, now U.S. Pat. 4,007,792.

This invention relates to the viscosification of surfactant compositions. In one of its more specific aspects, this invention relates to fracturing fluids. In accordance with another aspect, this invention relates to drilling mud additives. A further aspect of this invention is its use in tertiary oil recovery.

BACKGROUND OF THE INVENTION

It is known in the art that the formation of an oil-bearing zone can be fractured by subjecting it to a very high pressure. This is usually done by injecting a fracturing liquid, such as a brine, an acid, or a micellar solution into the borehole, and increasing the pressure to a value at which the rock fractures. Propping agents can be added to the fracturing liquid, which migrate into the fissures of the rock and keep them open after releasing the pressure. It also has been proposed to increase the viscosity of fracturing fluids by incorporating soluble polymers in the fracturing fluids. The increased viscosity is desirable both for reducing losses of the fluid into highly permeable zones and for increasing the capability of the fracturing fluid to carry solid propping agents.

It would be desirable to have a fracturing fluid available which is initially viscous but whose viscosity can be controllably reduced over a given period of time. Thus one desires a fluid that remains highly viscous just slightly longer than the fracturing period and thereafter becomes sufficiently liquid or fluid to be easily displaced from the newly-formed fissures by the oil and readily pumped out of the borehole.

Another field of the oil recovery art where viscosification of fluids is important is that of drilling. In certain operations, particularly where relatively thin drilling fluids such as water or brine are used, it is periodically desirable to clean the borehole and to remove cuttings therefrom. This can be achieved by circulating a composition through the well, which is viscous and which can carry cuttings out of the borehole. In this instance, too, it would be desirable to have a composition that has high viscosity, but loses this viscosity in a controlled time schedule. The viscous composition would then be adjusted so that it loses the high viscosity shortly after the cleaning cycle has been finished so that it can be conveniently displaced from the borehole by the thinner drilling fluid when drilling is resumed.

THE INVENTION

It is thus one object of this invention to provide a novel viscous fluid.

Another object of this invention is to provide a viscous thixotropic fluid that loses its viscosity at a controllable rate.

Still another object of this invention is to provide a new method to fracture a formation.

A further object of this invention is to provide a fracturing process in which an acid treatment of the borehole is performed simultaneously.

A still further object of this invention is to provide a method for cleaning a borehole.

A still further object of this invention is to provide a method of tertiary oil recovery with high efficiency.

In accordance with this invention, I have now found that a thixotropic fluid is obtained by suitably emulsifying a mixture of water and chloroform in the presence of minor amounts of an anionic surfactant, a cationic surfactant, an acid, and a salt, to form a viscosified surfactant fluid which has thixotropic properties.

This thixotropic fluid decreases in viscosity after a period of time, depending upon the pH of the aqueous phase. It has been found that this viscosified fluid loses viscosity rapidly, e.g., within about 8 hours, if this pH is 0; within about 1 to 2 days if this pH is about 1; and within about 1 to 2 months if this pH approaches the upper limit of 4.5. Thus the fluid can be modified to have a low viscosity after a time when the high viscosity originally achieved is no longer desired by merely adjusting the pH of the fluid.

The major component of the composition of this invention consists essentially of an emulsified mixture of water and chloroform containing 10–90, preferably 50–85, percent water by weight, based on the total combined weight of the water and chloroform. The water can be fresh water or a brine which is compatible with the system.

The cationic surfactant present in the composition of this invention in accordance with one embodiment thereof is selected from the group of compounds consisting of the quaternary ammonium salts of amines, including aliphatic primary, secondary and tertiary monoamines, aliphatic polyamines, rosin-derived amines, alkyl amino-substituted 2-alkylimidazolines, polyoxyethylene alkyl amines, polyoxyethylene alicyclic amines, N,N,N',N'-tetrakis-substituted ethylenediamines, and amines with amide linkages. The aliphatic polyamines preferably are alkylene diamines or dialkylene triamines. The number of carbon atoms in the cationic surfactant useful in accordance with this invention preferably is in the range of 10 to 30. A presently preferred example for a cationic surfactant useful in accordance with this invention is diisobutylphenoxyethoxyethyldimethylbenzylammonium chloride monohydrate. This compound is commercially available as Rohm and Haas thyamine 1622 in 98.8 weight percent purity.

The anionic surfactants in the preferred embodiment of this invention comprise those organic carboxylates, sulfonates, sulfates, or phosphates which are known to have surfactant properties. In accordance with the presently preferred embodiment of this invention, the anionic surfactant is employed as the sodium, potassium or ammonium salt. Examples of such anionic surfactants include lignosulfonates, alkylbenzene sulfonates, petroleum sulfonates, naphthalene sulfonates, olefin sulfonates, alkyl sulfonates, alkyl hydroxysulfonates, sulfonated polyethoxy alkyl phenols, sulfonated polyethoxy alkanes, alkyl sulfates, sulfated natural fats and oils, sulfated fatty acids, prticularly sulfated oleic acid, sulfated alkanolamides, sulfated esters, sulfated alkyl phenols, sulfated alcohols, 2-sulfoethyl esters of fatty acids, monoalkylsulfosuccinates, dialkyl sulfosuccinates, polyethoxy carboxylic acids, acylated protein hydrolysates, N-acylsarcosinates, alkyl carboxylic acids, cycloalkyl carboxylic acids, aryl carboxylic acids, alkyl phosphates, alkyl thiophosphates, alkyl polyphosphates, ethoxylated phosphate esters. The anionic surfactant preferably contains about 8 to 30 carbon atoms per molecule. The presently preferred anionic surfactants are the ammonium and sodium salts of petroleum sulfonic acids having an average molecular weight in the range of from about 200 to about 550.

Both the cationic surfactant and the anionic surfactant are each present in the composition of this invention in a concentration of 1–5,000 ppm, preferably 50–2,000 ppm, by weight based on the combined weight of the water and chloroform. The molar ratio of anionic surfactant to cationic surfactant is in the range of 4:1 to 0.1:1, preferably in a range of about 2:1 to 0.5:1.

The acids which are applicable for use in the present invention can be any convenient acids which are sufficiently ionizable to reduce the pH of the resulting composition to the desired level in the range of pH 0 to 4.5. Thus, depending on the desired pH, the acids can be inorganic acids such as hydrochloric, phosphoric, sulfuric, as well as suitable organic acids such as formic, acetic, chloroacetic acid and the like. Mineral acids are presently preferred.

The amount of acid incorporated into the viscosified composition will depend upon the nature of the acid, the nature of the other ingredients, and upon the specific pH level desired. Ordinarily the amount of acid will be in the range of 50–20,000 ppm, more usually 100–5,000 ppm, by weight based on the combined weight of the water and chloroform. As an additional requirement, the amount of acid incorporated will be sufficient to adjust the pH of the mixture to a value in the range of from about 0 to about 4.5, preferably in the range of from about 0.5 to about 4.5.

It is an important feature of this invention that the lifetime of the viscous solution after the mixing decreases with decreasing pH. Varying the pH from 0 to 4.5 will change the time period in which the composition loses its initial high viscosity from about 8 hours to 1 to 2 days and finally to 1 to 2 months for the pH of 4.5. This property of the composition of this invention is desirable because it allows a relatively accurate predetermination of the time after which the composition loses its high viscosity and can be readily removed or processed as a liquid again.

The composition of this invention must contain a water soluble alkali metal buffering salt. This salt should be water-soluble and capable of acting to some extent as a buffer. Preferably the salt's anion is the same as that of the acid. The cation of the salt preferably matches that of the anionic surfactant. The amount of salt incorporated into the viscosified composition will vary depending upon the amount and nature of the acid present, as well as upon the amounts and nature of the other ingredients. Ordinarily, the amount of salt will be in the range of 50–20,000 ppm, more usually 1,000–12,000 ppm, by weight based on the combined weight of the water and chloroform. For best effectiveness, the molar ratio of the salt to the acid should be in the range of about 0.1:1 to about 5:1. Molar ratios of about 2:1 are particularly effective.

Examples of salts useful as buffer salts in the composition of this invention are lithium sulfate, lithium chloride, sodium chloride, sodium formate, sodium sulfate, sodium nitrate, sodium acetate, potassium chloride, potassium sulfate, and potassium nitrate. The presently preferred buffer salts are sodium chloride and sodium sulfate.

Other additives of organic or inorganic nature can be incorporated into the composition of this invention in small amounts if they have no detrimental effect upon the viscosity or thixotropy. Minor amounts of other ingredients such as oil and dyes can also be employed provided they do not materially reduce the viscosity of the composition.

The composition of this invention is prepared by mixing the components in any suitable manner. In order to obtain a viscous composition, the components have to be vigorously agitated. The agitation preferably is carried out for at least one minute and should be sufficient to emulsify the composition. The temperature used for the mixing procedure is not critical, provided the components of the mixture are maintained in a substantially liquid state. Temperatures around the ambient temperature, such as 24° C, are presently preferred.

The composition of this invention can have an initial viscosity in the range from about 5 centipoise to about 4,000 centipoise at 24° C. The composition can form a virtually solid gel after agitation. The viscosity is measured on a Brookfield viscosimeter using the procedure disclosed in ASTM D 1824–66.

In accordance with another embodiment of this invention, there is provided a process for fracturing the formation rock around a borehole. This process comprises introducing a composition as defined above into the borehole, raising the pressure in the borehole to a range in which the rock fractures, maintaining the pressure for a given period, and releasing the pressure. The composition can thereafter be removed from the borehole. Pressures at which fracturing of the rock occurs vary in accordance with the nature of the rock. Generally, pressures at which fracturing is achieved are about 1 pound per foot of vertical depth depending upon the formation. A pressure in the borehole is usually maintained for a period of time of about ½ hour to 6 hours, depending on the formation and fluid loss characteristics of the fracture fluid.

In order to prevent the rock from closing the fissures produced by the fracturing again, it can be advantageous to incorporate so-called propping agents in the fracturing composition. Such propping agents preferably are selected from the group consisting of sand, glass beads, or metal pellets. The preferred propping agent is sand. The thixotropic fluid of this invention has the advantage of supporting and carrying these propping agents, essentially preventing a settling of these agents. Thus, the propping agents are effectively introduced into the fissures or cracks formed in the rock. The propping agents generally are employed in the composition of this invention for the fracturing in concentrations of about one half pound to about 10 pounds per gallon of fracturing fluid.

In accordance with still another embodiment of this invention, there is provided a method for cleaning a borehole during the drilling process. This method comprises introducing a composition as defined above into the borehole, removing the composition additionally comprising cuttings from the borehole, and letting this composition settle at the surface in a tank, or the like, to release the cuttings and recovering at least a portion of the liquids of the composition. The invention advantageously provides a highly viscous fluid to be introduced into the borehole, which effectively removes the cuttings from the borehole. After a period of time, depending upon its composition, the fluid loses its viscosity and is thereby easily displaced by the conventional drilling fluid when drilling is resumed.

In accordance with still another embodiment of this invention, there is provided a tertiary oil recovery process for recovering oil from previously water-flooded subterranean formations. This process comprises the steps of injecting a viscosified surfactant composition as defined above via at least one injection well into the oil-bearing formation, moving this composition through the formation towards at least one production well, and recovering displaced oil from said production well. The compositions of this invention do not contain macromolecular ingredients and the aggregates formed are sufficiently small so that they can reach practically the entire pore volume. This fact adds to the sweep efficiency of the surfactant flooding process of this invention.

Combined with either the fracturing process or the surfactant flood process or the borehole cleaning process described above, a borehole wall acidification can be carried out in accordance with this invention. For this combined process, the composition of this invention is kept in the borehole for a time sufficient to let it lose its high viscosity. Thereby the aqueous acid phase comes into full contact with the borehole wall, thus strongly acidifying on this wall. Thereby acid-soluble materials in the borehole that would affect the oil recovery can be etched away and removed.

All the embodiments described above in connection with the viscosified composition as such also apply to the process embodiments described, namely the fracturing process, the borehole cleaning process and the tertiary oil recovery process.

The invention will still be more fully understood from the following examples showing further preferred embodiments of this invention.

Then 25 ml of solution I was added to the solution II. This resulted in solution III. 5-Milliliter portions of an aqueous 0.0020165 molar solution of diisobutylphenoxyethoxyethyldimethylbenzylammonium chloride monohydrate (commercially available under the trade name Hyamine 1622 and consisting of 98.8 weight percent of the monohydrate and 1.2 weight percent of inert ingredients) was then added to the mixture III. After each addition the mixture was shaken vigorously for at least one minute and its viscosity was tested. A total of 30 ml of the aqueous ammonium chloride monohydrate (Hyamine 1622) solution was added to the solution III. The viscosity of the solution obtained was measured in accordance with ASTM D 1824-66 of a Brookfield viscosimeter. The results obtained are shown in the following table. Run 1 is a control run containing no cationic surfactant.

TABLE I

| Run No. | $H_2O$ (g) | Cationic[b] (g) | $H_2O$ % | $CCl_3H$ % | Cationic[b] (ppm) | Anionic[c] (ppm) | $H_2SO_4$ (ppm) | $Na_2SO_4$ (ppm) | Viscosity (cp) |
|---|---|---|---|---|---|---|---|---|---|
| 1 | 73.4 | 0 | 66.6 | 33.4 | 0 | 1780 | 3200 | 11,300 | 306 |
| 2 | 78.4 | 0.00466 | 68.0 | 32.0 | 40 | 1710 | 3060 | 10,800 | 687 |
| 3 | 83.4 | 0.00932 | 69.4 | 30.6 | 77 | 1640 | 2940 | 10,400 | 1710 |
| 4 | 88.4 | 0.0140 | 70.6 | 29.4 | 112 | 1570 | 2820 | 9,980 | 1920 |
| 5 | 93.4 | 0.0186 | 71.7 | 28.3 | 143 | 1510 | 2710 | 9,600 | 2000 |
| 6 | 98.4 | 0.0233 | 72.8 | 27.2 | 172 | 1460 | 2610 | 9,240 | >2000 |
| 7 | 103.4 | 0.0280 | 73.8 | 26.2 | 200 | 1400 | 2520 | 8,920 | >2000 |

[a]Each composition contained 36.8 g $CCl_3H$, 0.353 g $H_2SO_4$, 1.25 g $Na_2SO_4$, and 0.1967 g anionic surfactant. The pH of each composition was in the range of 0.5–4.5. All percent and ppm values are by weight based on the combined weight of the water and $CCl_3H$.
[b]Diisobutylphenoxyethoxyethyldimethylbenzylammonium chloride monohydrate (Hyamine 1622).
[c]Sodium petroleum sulfonate, about 420 mol. wt. (Witco Petronate TRS 10-CL.)
[d]ASTM D 1824-66 (Brookfield Viscosimeter).

The data in Table I indicate that the compositions of this invention have a very high viscosity. The composition behaved like a non-Newtonian fluid. The combination of the cationic surfactant with the anionic surfactant resulted in a large increase in viscosity.

EXAMPLE II

Further runs were carried out with varying compositions and the viscosity in centipoise for these samples was also determined. The compositions and results are shown in the following table.

TABLE II

| Run No. | $H_2O$ (g) | Cationic[b] (g) | Anionic[c] (g) | $H_2O$ % | Cationic[b] (ppm) | Anionic[c] (ppm) | $H_2SO_4$ (ppm) | $Na_2SO_4$ (ppm) | Viscosity cp |
|---|---|---|---|---|---|---|---|---|---|
| 8 | 99.54 | 0.0235 | 0.0523 | 73.0 | 172 | 383 | 2590 | 9170 | >2000 |
| 9 | 200.29 | 0.105 | 0.1209 | 82.0 | 429 | 495 | 1440 | 5110 | >2000 |
| 10 | 98.38 | 0.0222 | 0.1142 | 72.8 | 164 | 845 | 2610 | 9250 | >2000 |
| 11 | 93.38 | 0.0178 | 0.1358 | 71.7 | 137 | 1040 | 2710 | 9600 | 1540 |
| 12 | 95.90 | 0.0678 | 0.1649 | 72.3 | 511 | 1240 | 2660 | 9420 | 334 |

[a]Each composition contained 0.353 g $H_2SO_4$, 36.8 g $CCl_3H$ except Run 9 which contained 44.1 g $CCl_3H$, and 1.25 g $Na_2SO_4$ in addition to the above-listed ingredients. The pH of each was in the range of 0.5–4.5. All percent and ppm values are by weight based on the combined weight of the water and $CCl_3H$.
[b]See note b, Table I.
[c]See note c, Table I.
[d]See note d, Table I.

EXAMPLE I

This example is given to show the viscosity of compositions of the present invention. 25 Grams of $Na_2SO_4$ and 4 ml of concentrated sulfuric acid (96 weight percent $H_2SO_4$) were dissolved in sufficient water to give 500 ml of solution I. 50 Milliliters of distilled water was combined with 25 ml (36.8 gm) of chloroform and 0.1967 gm of sodium petroleum sulfonate (commercially available as Witco Petronate TRS-10-CL anionic surfactant of about 420 mol wt., about 62% active) and the mixture was stirred. This resulted in solution II.

The results shown above again indicate that the composition of this invention possesses very high viscosity that renders it useful for the purposes described.

EXAMPLE III

A composition was mixed essentially as described in Example I using, however, the ingredients and quantities shown in the following table. The results of the viscosity determinations are also shown in the following table.

TABLE III

| | | | | | | | | | |
|---|---|---|---|---|---|---|---|---|---|
| | Viscosified Compositions[a] Containing HCl | | | | | | | | |
| Run No. | $H_2O$ (g) | Cat- ionic[b] (g) | HCl (g) | $H_2O$ % | Cat- ionic[b] (ppm) | Ani- onic[c] (ppm) | HCl (ppm) | NaCl (ppm) | Vis- cosity[d] cp |
| 13 | 163.94 | 0.0275 | 0.028 | 81.7 | 137 | 960 | 139 | 5130 | 1694 |
| 14 | 173.19 | 0.022 | 3.778 | 82.5 | 105 | 918 | 18,000 | 4900 | 410 |

[a]Each composition contained 36.8 g $CCl_3H$, 1.029 g NaCl and 0.1928 g anionic surfactant. The pH of Run 13 was <4.5 and the pH of Run 14 was about 0. All percent and ppm values are by weight based on the combined weight of the water and $CCl_3H$.
[b]See note b, Table I.
[c]See note c, Table I.
[d]See note d, Table I.

The results of this example also show that a highly viscous fluid can be obtained utilizing hydrochloric acid for the pH adjustment and sodium chloride as the buffer salt. Run 14 shows that much of the viscosity is lost as the pH of composition approaches zero.

EXAMPLE IV

This example is given to show the capability of the viscosified composition of this invention to suspend a propping agent and thus to illustrate the suitability of the composition as a fracturing fluid. Three runs were made using a fluid consisting of 73.8% $H_2O$, 26.2% $CCl_3H$, 194 ppm cationic surfactant (Hyamine 1622), 1400–1500 ppm anionic surfactant (Petronate TRS-10-CL), 2518 ppm $H_2SO_4$ and 8916 ppm $Na_2SO_4$. Three 142 g-samples of this fluid were mixed with about 10 grams of 21–40 mesh Berea sandstone. The samples were then allowed to stand for the stipulated time shown in the following table. After this setting time, the separated top half and bottom half of the samples were tested for the amount of the Berea sandstone each contained. The results of this test are also shown in the following table.

TABLE IV

| | Suspension of Particulate Solids in Fracturing Fluid | | | |
|---|---|---|---|---|
| Run No. | Sandstone Added, g | Settling Time, min. | % Stone In Top Half | % Stone In Bottom Half |
| 15 | 10.0236 | 15 | 36.50 | 63.50 |
| 16 | 10.0492 | 30 | 38.55 | 61.45 |
| 17 | 9.9073 | 60 | 3.91 | 96.09 |

The results of the above-shown table indicate that a composition of this invention suspends the propping material well and can be thus effectively used for fracturing a formation.

EXAMPLE V

The following example is a calculated example showing the use of the composition of this invention in a waterflooding process. The calculation is based on the extension of actual data obtained in the laboratory and in the field of an Oklahoma oil field, as well as on the data obtained in the laboratory for the viscosified composition of this invention. The calculation is based on the mathematical equations contained in the article, "Prediction of Polymer Performance" by J. T. Patton, K. H. Coats, and G.T. Colegrove, Soc. Pet. Eng. Jour., March, pp. 72–84, (1971), also published as S.P.E. No. 2546, 44th Ann. Meeting, Denver (1969). The details used, together with a computer program for solving the equations of this mathematical system, were as follows:

A 5-spot flood simulation was made with the following specifications:

Inter-well distance: 466.70 feet (that is the distance from the injection well to the production wells).

Well radius: 1 foot (that is half the diameter of the borehole).

Constant injection rate: 1,000 barrels/day (that is the injection rate of all the materials).

Total water injected before the composition of this invention is injected: 2,160,000 barrels (water was injected for 2,160 days).

Total additive composition of this invention injected: 270,000 barrels (the viscous composition of this invention is injected for 270 days). The composition consists of about 10 percent $CCl_3H$, 90 percent $H_2O$, 790 ppm anionic surfactant (Witco Petronate TRS-10-CL), 88 ppm cationic surfactant (Hyamine 1622), 140 ppm HCl and 5,000 ppm NaCl. Thus each barrel of thickened surfactant fluid contains about 35 lb. $CCl_3H$, about 0.2765 lb. anionic surfactant, about 0.0309 lb. cationic surfactant (a total of about 0.3074 lb. total surfactants), about 0.049 lbs. HCl, and about 1.75 lb. NaCl.

Additive retained by the reservoir: 400 pounds/acre foot (this is the adsorption rate for the surfactants by 1 acre foot of reservoir).

Oil viscosity before the slug of the composition of this invention: 3 centipoise.

Oil viscosity in the slug containing the composition of this invention: 3 centipoise.

Oil viscosity behind the slug of the composition of this invention: 3 centipoise.

Water viscosity before the slug of the composition of this invention is introduced: 0.6 centipoise.

Water viscosity in the slug of the composition of this invention: 100 centipoise.

Water viscosity behind the slug of the composition of this invention: 100 centipoise (following the slug of the composition of this invention of polymer viscosified water slug is introduced).

Gas viscosity: 0.015 centipoise.

Oil formation volume factor: 1.05 (that is the ratio of 1 barrel of oil under reservoir conditions to the volume of 1 barrel of oil under stocktank conditions).

A reservoir pore volume: $3.007 \times 10^{+7}$ cu. ft. = $0.53553 \times 10^{+6}$ bbls.

The reservoir is divided into 5 layers based upon data obtained by cores and wells of the oil field. The properties of these layers are shown in the following table:

TABLE Va

| | Thickness, ft. | Absolute Permeability (millidarcy) | Porosity | Initial Oil Saturation | Initial water Saturation | Pore volume (millions of bbls.) | Oil in layer (millions of bbls.) |
|---|---|---|---|---|---|---|---|
| Layer 1 | 9 | 67.500 | 0.1768 | 0.4488 | 0.3219 | 0.12344 | 0.052764 |

TABLE Va-continued

|  | Thickness, ft. | Absolute Permeability (millidarcy) | Porosity | Initial Oil Saturation | Initial water Saturation | Pore volume (millions of bbls.) | Oil in layer (millions of bbls.) |
|---|---|---|---|---|---|---|---|
| Layer 2 | 9 | 28.125 | 0.1605 | 0.4919 | 0.3582 | 0.11206 | 0.052499 |
| Layer 3 | 9 | 17.625 | 0.1532 | 0.5176 | 0.3823 | 0.10697 | 0.052730 |
| Layer 4 | 9 | 9.775 | 0.1440 | 0.5502 | 0.4135 | 0.10054 | 0.052685 |
| Layer 5 | 9 | 3.925 | 0.1325 | 0.6023 | 0.3977 | 0.092514 | 0.053068 |

The relative permeability of each layer to gas is 1.

The behaviors of the formation when flooded with water, a composition of this invention, and finally a polymer-viscosified agent, were determined in the laboratory by measuring the relative permeability to oil and to the respective slugs as a function of the water saturation. The results for these functions obtained in the laboratory were as follows:

TABLE Vb

| Water Saturation (fraction) | Relative Permeability to Oil Before Additive Slug | Relative Permeability to Water Before Additive Slug |
|---|---|---|
| 0.17 | 0.830 | 0.000 |
| 0.46 | 0.310 | 0.001 |
| 0.50 | 0.245 | 0.002 |
| 0.55 | 0.152 | 0.006 |
| 0.60 | 0.082 | 0.010 |
| 0.065 | 0.040 | 0.024 |
| 0.70 | 0.017 | 0.080 |
| 0.75 | 0.005 | 0.150 |
| 0.80 | 0.002 | 0.240 |
| 0.85 | 0.000 | 0.420 |

TABLE Vc

| Water Saturation (fraction) | Relative Permeability to Oil in Region of Additive Slug | Relative Permeability to Water in Region of Additive Slug |
|---|---|---|
| 0.00 | 1.0000 | 0.000 |
| 0.40 | 0.3020 | 0.330 |
| 0.50 | 0.1700 | 0.440 |
| 0.60 | 0.0800 | 0.545 |
| 0.70 | 0.0270 | 0.660 |
| 0.75 | 0.0100 | 0.720 |
| 0.78 | 0.0080 | 0.750 |
| 0.85 | 0.0050 | 0.830 |
| 0.90 | 0.0027 | 0.890 |
| 0.95 | 0.0000 | 0.977 |

TABLE Vd

| Water Saturation (fraction) | Relative Permeability to Oil Behind Additive Slug | Relative Permeability to Water Behind Additive Slug |
|---|---|---|
| 0.00 | 1.0000 | 0.000 |
| 0.40 | 0.3020 | 0.330 |
| 0.50 | 0.1700 | 0.440 |
| 0.60 | 0.0800 | 0.545 |
| 0.70 | 0.0270 | 0.660 |
| 0.75 | 0.0100 | 0.720 |
| 0.78 | 0.0080 | 0.750 |
| 0.85 | 0.0050 | 0.830 |
| 0.90 | 0.0027 | 0.890 |
| 0.95 | 0.0000 | 0.977 |

The distance of 466.70 feet between the injection well and one production well is divided into 20 steps, the distance of which is calculated by the mathematical relationships cited above to be 1.00, 73.80, 104.36, 127.81, 147.59, 165.00, 180.75, 195.24, 208.71, 221.38, 233.35, 245.32, 257.98, 271.46, 285.95, 301.70, 319.11, 338.89, 362.34, 392.90, 465.70 feet. The production of this flooding process was calculated for 5500 days of running time, the time steps size being 10 days.

With all these data based on the mathematics cited above, a computer calculation was carried out to determine the production of water and oil. Some typical results are shown in Table Vb, assuming that the flood was started at the day 0 with an injection of 1,000 barrels per day of water; that from the day 2,160 on, the viscosified surfactant composition of this invention having a viscosity of 100 centipoise is injected for 270 days at a rate of 1,000 barrels per day; and that from the day 2,440 on, a polymerviscosified water slug of 100 centipoise at a rate of 1,000 barrels per day is injected. The calculation is carried out for a period of 5,500 days; however, after 4,020 days the production rate drops rather rapidly to less than 1 barrel oil per day from the 4,230th day on. Therefore, the results are only shown including the 4,020th day.

TABLE Ve

| Time days | Oil Rate bbl/day | Water Rate bbl/day |
|---|---|---|
| 0 | 0 | 0 |
| | Start Water Flush | |
| 10 | 12.674 | 67.076 |
| 50 | 192.011 | 20.705 |
| 100 | 566.950 | 404.701 |
| 200 | 187.413 | 803.209 |
| 400 | 61.822 | 935.087 |
| 1000 | 36.094 | 960.087 |
| 2000 | 9.072 | 990.450 |
| 2150 | 8.669 | 990.950 |
| | Start Viscosified Surfactant Flood | |
| 2160 | 180.231 | 810.800 |
| 2200 | 18.966 | 979.950 |
| 2300 | 15.281 | 984.000 |
| 2438 | 74.103 | 922.100 |
| | Start Polymer-Thickened Drive Fluid | |
| 2440 | 70.141 | 926.300 |
| 2600 | 90.766 | 904.700 |
| 2800 | 105.322 | 889.400 |
| 3000 | 49.156 | 948.350 |
| 3200 | 25.703 | 972.850 |
| 3400 | 11.959 | 987.300 |
| 3600 | 10.325 | 989.000 |
| 3800 | 8.569 | 990.100 |
| 4000 | 16.722 | 982.300 |
| 4020 | 8.675 | 990.800 |

The cumulative oil produced in this calculated example is 210,450 stock tank barrels or 0.4126 pore volume. This result has to be compared with an original oil saturation of the 5 layers of 263,746 stock tank barrels or 0.5171 pore volume. Thus it can clearly be seen that by the process and composition of this invention, a very effective oil recovery can be achieved.

Reasonable variations and modifications, which will become apparent to those skilled in the art, can be made in this invention without departing from the spirit and scope thereof.

I claim:

1. A process for recovering oil from subterranean formations comprising
    A. injecting into the formation via at least one injection well, a composition of matter comprising in admixture:
        a. a fluid consisting essentially of
            10–90 weight percent of water,
            90–10 weight percent of chloroform,
        b. 1–5000 ppm of a cationic surfactant,
        c. 1–5000 ppm of an anionic surfactant, d. 50–20,000 ppm acid in a quantity sufficient to reach a pH of ≦4.5 in the aqueous phase, and e. 50–20,000 ppm buffer salt in mol ratio of buffer salt to: acid component d in the range of 0.1:1 to 5:1, the ppm values being based on the combined weight of water and chloroform, B. moving the composition through the formation towards at least one production well, so that said composition displaces the oil in the formation toward said production well or wells, and C. recovering oil and at least a portion of said composition from said production well or wells.

2. A process in accordance with claim 1 wherein said cationic surfactant is a quaternary ammonium salt of an amine wherein said anionic surfactant is selected from the group consisting of organic carboxylates, sulfonates, sulfates and phosphates, wherein said acid is a mineral acid, and wherein said buffer salt is an alkali metal salt having the same anion as said mineral acid.

* * * * *

UNITED STATES PATENT AND TRADEMARK OFFICE
CERTIFICATE OF CORRECTION

PATENT NO. : 4,071,457
DATED : January 31, 1978
INVENTOR(S) : John J. Meister

It is certified that error appears in the above-identified patent and that said Letters Patent are hereby corrected as shown below:

In the title, after "SURFACTANT" please insert --- SOLUTIONS ---.

Column 10, line 65, before "10-90" please insert --- aa. ---, and

Column 10, line 66, before "90-10" please insert --- bb. ---

Signed and Sealed this

Twenty-seventh Day of June 1978

[SEAL]

Attest:

RUTH C. MASON
*Attesting Officer*

DONALD W. BANNER
*Commissioner of Patents and Trademarks*